US011919726B2

United States Patent
Guruswamy et al.

(10) Patent No.: US 11,919,726 B2
(45) Date of Patent: Mar. 5, 2024

(54) FINGER GUARD APPARATUS AND METHOD OF USING THE SAME

(71) Applicant: INTELLIGRATED HEADQUARTERS, LLC, Mason, OH (US)

(72) Inventors: Udayakumar Guruswamy, Coimbatore (IN); Gaurav Singh Rana, Kangra (IN)

(73) Assignee: INTELLIGRATED HEADQUARTERS, LLC, Mason, OH (US)

( * ) Notice: Subject to any disclaimer, the term of this patent is extended or adjusted under 35 U.S.C. 154(b) by 5 days.

(21) Appl. No.: 17/657,531

(22) Filed: Mar. 31, 2022

(65) Prior Publication Data

US 2023/0312269 A1  Oct. 5, 2023

(51) Int. Cl.
*B65G 47/66* (2006.01)
*B65G 15/24* (2006.01)

(52) U.S. Cl.
CPC ............. *B65G 47/66* (2013.01); *B65G 15/24* (2013.01); *B65G 2207/40* (2013.01)

(58) Field of Classification Search
None
See application file for complete search history.

(56) References Cited

U.S. PATENT DOCUMENTS

| 3,548,996 A * | 12/1970 | Ellis .................... B65G 47/66 198/610 |
| 6,899,219 B2 | 5/2005 | Cotter et al. |
| 8,590,697 B2 | 11/2013 | Lim et al. |
| 10,427,891 B2 * | 10/2019 | McKee ................ B65G 47/66 |
| 2019/0002210 A1 | 1/2019 | Hekman et al. |

FOREIGN PATENT DOCUMENTS

CN  203294687 U  11/2013

* cited by examiner

*Primary Examiner* — Kavel Singh
(74) *Attorney, Agent, or Firm* — Alston & Bird LLP (57) ABSTRACT

Various embodiments are directed to a finger guard apparatus comprising a mounting bracket configured to be secured to a conveyor assembly such that the mounting bracket defines a first lateral side of the finger guard apparatus; a finger guard plate detachably secured to the mounting bracket; and a lock assembly that secures the finger guard plate in a locked position relative to the mounting bracket and is configured to facilitate selective detachment of the finger guard plate from the mounting bracket, the lock assembly comprising: a lock arm connected to the mounting bracket such that the lock arm is configured to move between a locked position and an unlocked position, wherein the lock arm is configured to engage the finger guard plate in the locked position; and a retention element engaged with the lock arm and configured to bias the lock arm towards the locked position.

1 Claim, 4 Drawing Sheets

FINGER GUARD APPARATUS AND METHOD OF USING THE SAME

FIELD OF THE INVENTION

Various embodiments described herein relate generally to a material handling system for handling items, and, more particularly, to apparatuses for use with conveyor assemblies configured to facilitate transportation of items along a conveyor surface.

BACKGROUND

Generally, in material handling environments like, but not limited to, distribution centers, warehouses, inventories, or shipping centers, a material handling system can convey, handle, sort, and organize various type of articles (e.g. items, cartons, cases, containers, shipment boxes, totes, packages, and/or the like) using one or more conveyor assemblies. Through applied effort, ingenuity, and innovation, Applicant has solved problems relating to conveyor assemblies by developing solutions embodied in the present disclosure, which are described in detail below.

BRIEF SUMMARY

Various embodiments are directed to a finger guard apparatus for a conveyor assembly and method of using the same. In various embodiments, a finger guard apparatus may comprise a mounting bracket configured to be secured to a first lateral conveyor frame portion of a conveyor assembly such that the mounting bracket defines a first lateral side of the finger guard apparatus; a finger guard plate detachably secured to the mounting bracket at a first finger guard plate lateral end, the finger guard plate comprising an upper guard sheet that extends between the first finger guard plate lateral end and a second finger guard plate lateral end; and a lock assembly that secures the finger guard plate in a locked position relative to the mounting bracket and is configured to facilitate selective detachment of the finger guard plate from the mounting bracket, the lock assembly comprising: a lock arm connected to the mounting bracket such that the lock arm is configured to move between a locked position and an unlocked position, wherein the lock arm is configured to engage the finger guard plate in the locked position; and a retention element engaged with the lock arm and configured to bias the lock arm towards the locked position.

In various embodiments, the lock arm may be hingedly connected to the mounting bracket such that the lock arm is configured to rotate about a lock arm hinge between the locked position and the unlocked position, wherein the retention element is configured to rotationally bias the lock arm towards the locked position. In various embodiments, the finger guard apparatus may be configured such that the finger guard plate is selectively removeable from an installed configuration relative to the mounting bracket when the lock arm is in the unlocked position. In various embodiments, the lock arm of the lock assembly may be arranged relative to the mounting bracket such that when the lock arm is the locked position, a user engagement portion of the lock arm defined at a distal end thereof is positioned at least substantially adjacent a top portion of the mounting bracket.

In various embodiments, the lock arm may be configured for selective arrangement in the unlocked position based on a user interaction with the lock arm. In certain embodiments, the user interaction is defined by a force applied to the lock arm that is at least substantially larger than a retention element force imparted on the lock arm from the retention element. In certain embodiments, upon a user disengagement of the lock arm, the lock arm may be configured to return to the locked position based at least in part on the retention element force. In various embodiments, the retention element may extend between the mounting bracket and the lock arm. In certain embodiments, the retention element may be a spring. In certain embodiments, the retention element may be configured to define a first expanded position when the lock arm is in the locked position and a second expanded position when the lock arm is in the unlocked position such that the lock arm is at least substantially continuously biased toward the finger guard plate based at least in part on the retention element.

In various embodiments, the lock arm may be configured to engage the finger guard plate in the locked position to at least partially restrict a range of relative motion between the finger guard plate and the mounting bracket in one or more directions. In certain embodiments, the one or more directions may comprise a vertical direction. In various embodiments, the lock arm may comprise a lock arm protrusion, and wherein the lock arm is configured to at least partially restrict the range of relative motion between the finger guard plate and the mounting bracket in the locked position based at least in part on the position of the lock arm protrusion relative to the finger guard plate. In certain embodiments, the lock arm protrusion may comprise a locked arm protrusion top surface having an at least partially curved configuration.

In various embodiments, the finger guard plate may comprise a finger guard plate slot defining an opening configured to receive at least a portion of the lock arm therein when the lock arm is arranged in the locked position. In various embodiments, the finger guard apparatus may further comprise a second mounting bracket configured to be secured to a second lateral conveyor frame portion of the conveyor assembly such that the second mounting bracket defines a second lateral side of the finger guard apparatus, wherein the finger guard plate is detachably secured to the second mounting bracket at the second finger guard plate lateral end; and a second lock assembly that secures the finger guard plate in a locked position relative to the second mounting bracket.

In various embodiments, the mounting bracket may be at least partially secured to the first lateral conveyor frame portion by a first fastening means that is engaged with the mounting bracket at a fastening aperture defined within the mounting bracket, wherein the fastening aperture comprises a length defined by an at least partially curved profile. In various embodiments, the finger guard plate may comprise an upper guard sheet and a lower guard sheet, wherein the lower guard sheet extends from a bottom surface of the upper guard sheet such that the finger guard plate comprises a T-bar configuration, and wherein the lock arm is configured to engage the lower guard sheet of the finger guard plate. In various embodiments, the finger guard plate may be configured to be positioned within an opening defined along a conveying surface of the conveyor assembly so as to provide coverage over at least a portion of an interior conveyor portion of the conveyor assembly to restrict user access thereto through the opening.

Various embodiments are directed to a finger guard apparatus for a conveyor assembly, the finger guard apparatus comprising: a mounting bracket configured to be secured to a first lateral conveyor frame portion of a conveyor assembly such that the mounting bracket defines a first lateral side of the finger guard apparatus; a finger guard plate detachably secured to the mounting bracket at a first finger guard plate lateral end, the finger guard plate comprising an upper guard sheet that extends between the first finger guard plate lateral end and a second finger guard plate lateral end; and a lock assembly that secures the finger guard plate in a locked position relative to the mounting bracket and is configured to facilitate selective detachment of the finger guard plate from the mounting bracket, the lock assembly comprising a lock arm extending between a proximal arm end and a distal arm end, the proximal arm end being fixedly secured to the mounting bracket; wherein the lock arm is made of an at least partially elastic material such that the lock arm is configured to move between a locked position and an unlocked position based at least in part on an arrangement of the distal arm end relative to the finger guard plate, wherein the lock arm is configured to engage the finger guard plate in the locked position; and wherein the lock arm is configured relative to the mounting bracket such that the lock arm defines an at least partially elastically deformed configuration in the locked position, wherein the at least partially elastically deformed configuration of the lock arm is configured to rotationally bias the distal arm end of the lock arm towards the finger guard plate.

BRIEF DESCRIPTION OF THE DRAWINGS

Reference will now be made to the accompanying drawings, which are not necessarily drawn to scale, and wherein.

DETAILED DESCRIPTION

The present disclosure more fully describes various embodiments with reference to the accompanying drawings. It should be understood that some, but not all embodiments are shown and described herein. Indeed, the embodiments may take many different forms, and accordingly this disclosure should not be construed as limited to the embodiments set forth herein. Rather, these embodiments are provided so that this disclosure will satisfy applicable legal requirements. Like numbers refer to like elements throughout.

It should be understood at the outset that although illustrative implementations of one or more aspects are illustrated below, the disclosed assemblies, systems, and methods may be implemented using any number of techniques, whether currently known or not yet in existence. The disclosure should in no way be limited to the illustrative implementations, drawings, and techniques illustrated below, but may be modified within the scope of the appended claims along with their full scope of equivalents. While values for dimensions of various elements are disclosed, the drawings may not be to scale.

The words "example," or "exemplary," when used herein, are intended to mean "serving as an example, instance, or illustration." Any implementation described herein as an "example" or "exemplary embodiment" is not necessarily preferred or advantageous over other implementations.

As used herein, directional terms used to describe a component, configuration, action, position, direction, and/or the like (e.g., "rearward," "an upward vertical direction," "laterally outward," "bottom," "top," and the like) are meant to be interpreted relative to a hypothetical conveyor apparatus provided on an at least substantially flat horizontal surface, but the terms are not to be interpreted as requiring the conveyor apparatus to be in this orientation at any particular time.

Conveyor apparatuses may be used in, for example, industrial manufacturing and packaging applications to facilitate the transportation of objects to a desired delivery location within a factory or a warehouse. For example, conveyor apparatuses can include a conveyor surface that extends along a length of the conveyor apparatus and supports items disposed thereon as the items are transported along a conveyor travel path towards a destination location. Further, conveyor apparatuses may comprise a conveyor frame that may include various structural components such as, for example, sidewalls, panels, and/or the like that are assembled relative to one another to provide a frame capable of supporting the conveyor surface along the length of the apparatus. For example, a finger guard apparatus may be installed within a conveyor assembly to prevent unauthorized and/or unintended access to an internal portion of the conveyor apparatus, various controls and mechanisms housed within the frame of the conveyor apparatus, and/or the like, via an opening defined along a conveyor surface of the conveyor assembly.

Various finger guard apparatuses are configured to be installed within a conveyor apparatus by being secured relative to the conveyor frame of the conveyor apparatus. In such finger guard apparatuses, the rigid configuration of the attachment of the finger guard apparatus may result in an inelastic deformation of one or more components of the finger guard apparatus over the life of the product, resulting in a decreased apparatus lifespan. In particular, various finger guard apparatuses are configured to be rigidly secured to one or more portions of a conveyor frame such that the finger guard apparatus may rigidly extend over an opening defined along a portion of the conveyor surface in a position between adjacent conveyor sections of the conveyor assembly. In such finger guard apparatuses, the rigid configuration of the attachment of the finger guard apparatus between adjacent conveyor sections may cause a deformation of at least part of the finger guard apparatus in a circumstance where one of the adjacent conveyor sections is positionally and/or angularly reconfigured relative to the other. For example, an increase and/or decrease in the angle at which one of the adjacent conveyor sections is arranged relative to the other may result in a deformation of the finger guard apparatus rigidly secured therebetween. Such deformation may cause a loosening of one or more components of the finger guard apparatus installed within the conveyor assembly, which may result in undesirable movement of the finger guard apparatus relative to the conveyor frame, undesirable noise (e.g., rattling), partial inoperability of the apparatus, and/or unintentional uninstallation of one or more components of the finger guard apparatus relative to the conveyor assembly.

Further still, various fingers guard apparatuses include one or more components that are removably secured to the conveyor frame via one or more rigid fastening means, such as, for example, a nut and bolt fastening means, such that the one or more components may be removed from an installed configuration within the conveyor assembly on the engagement and/or disengagement of the rigid fastening means.

Such exemplary finger guard apparatuses are subject to various components thereof that facilitate the removeable configuration of the one or more removeable components experiencing an at least partially inelastic deformation caused by the physical forces exerted on the components as a result of the removeable component being removed (e.g., repeatedly from an installed configuration relative to the finger guard apparatus. As described above, such deformation may cause a loosening of one or more components of the finger guard apparatus installed within the conveyor assembly, which may result an increase in operational inefficiencies exhibited by the finger guard apparatus and/or the removeable components thereof (e.g., unintentional component movement and/or reconfiguration, undesirable noise, partial inoperability of the apparatus, at least partial uninstallation of the removeable components of the finger guard apparatus relative to the fixedly secured components thereof, and/or the like) over the lifespan of the apparatus.

Further, various finger guard apparatus having one or more removeable components may include a variety of hinge and/or locking mechanisms that collectively may result in a complex unlocking operation that requires an undesirably large number of actions to be executed in order for the removeable component(s) to be removed and/or uninstalled from within the conveyor apparatus. Such finger guard apparatuses defined by complex installation and/or operation processes can increase the risk of improper installation or operation of the finger guard apparatus (e.g., the finger guard apparatus being left in an at least partially uninstalled and/or unsecured configuration relative to the conveyor assembly), resulting in dangerous conditions within the within the materials handling environment.

Various embodiments described herein are directed to finger guard apparatuses comprising a mounting bracket configured to be secured to a conveyor frame of a conveyor assembly, a finger guard plate detachably secured to the mounting bracket and configured to provide coverage over at least a portion of an internal conveyor portion, and a lock assembly that secures the finger guard plate in a locked position relative to the mounting bracket and is configured to facilitate selective detachment of the finger guard plate from the mounting bracket. In various embodiments, the lock assembly of the finger guard apparatus includes a lock arm hingedly connected to the mounting bracket such that the lock arm is configured to rotate about a lock arm hinge between a locked position in which the lock arm engages the finger guard plate so as to secure the position of the finer guard plate relative to the mounting bracket in one or more directions, and an unlocked position in which the lock arm is disengaged from the finger guard plate such that the finger guard plate may be removed from an installed configuration within the conveyor assembly. Further, as described herein, the lock assembly of the finger guard apparatus may comprise a retention element engaged with the lock arm and configured to rotationally bias the lock arm towards the locked position.

In various embodiments, the present invention includes a finger guard apparatus comprising a lock assembly configured to facilitate a simplified installation process associated with the removeable finger guard plate being positioned in an installed configuration within the conveyor assembly (e.g., relative to the mounting bracket). For example, as described herein, the lock assembly may comprise a lock arm that is configured to be arranged in a default upright position based on the configuration of a retention element coupled thereto, and comprises a lock arm protrusion configured to secure the detachable finger guard plate in an installed configuration by engaging a finger guard plate slot provided on the finger guard plate. The lock arm protrusion may include an upper protrusion surface having an at least partially curved and/or angled profile relative to the length of the lock arm, such that the finger guard plate may be forced in a downward direction towards the installed configuration to engage the upper protrusion surface to cause a downward force to be applied thereto, which, based on the hinged configuration of the lock arm, causes the lock arm to be moved out of the downward path of the finger guard plate. As described herein, the finger guard plate includes a finger guard plate slot positioned such that upon the finger guard plate being lowered to a positioned corresponding to an installed configuration, the finger guard plate slot may be aligned with the lock arm protrusion of the lock arm, such that the lock arm, based at least in part on the configuration of the retention element, as described herein, is retracted towards a locked position such that the lock arm protrusion is positioned within the finger guard plate slot, thereby automatically securing the position of the finger guard plate in the installed configuration. Such an exemplary configuration enables a substantially simplified installation process that minimizes the amount of tools and mechanical actions required to safely install the finger guard apparatus within the conveyor assembly.

Further, in various embodiments, the present invention includes a finger guard apparatus comprising a mounting bracket that includes at least one fastening aperture configured to facilitate the attachment of the finger guard apparatus to the conveyor frame such that the finger guard apparatus is configured to accommodate a change in angular configuration of one of the two adjacent conveyor sections to which the finger guard apparatus is secured. For example, an exemplary finger guard apparatus may comprise a fastening aperture defined by a slot having a length that extends along an at least partially curved profile. In such an exemplary configuration, as the angular configuration of a conveyor section to which the finger guard apparatus is secured via a fastening means provided within the curved fastening aperture is adjusted (e.g., the conveyor section is moved to an inclined and/or a declined angular configuration relative to the adjacent conveyor section to which the mounting bracket of the finger guard apparatus is also connected), the fastening means provided in the curved fastening aperture may slide, translate and/or otherwise move along the curved profile of the fastening aperture such that the forces transferred to the mounting bracket as a result of the angular movement of the second conveyor section are minimized. For example, in various embodiments, the curved profile of the curved fastening aperture may comprise an at least substantially "U"-shaped curve such that the finger guard apparatus may be configured to accommodate a change in angular configuration in both an incline direction and a decline direction.

A conveyor assembly may be configured to facilitate the transportation of one or more objects along a conveyor surface that is defined along the length of the conveyor apparatus to a desired downstream location. For example, a conveyor assembly may comprise a plurality of conveyor sections, each comprising a respective conveyor surface, that are arranged relative to one another such that the respective conveyor surfaces collectively define a conveyor surface along which an object may at least substantially continuously transported towards the downstream location. An exemplary conveyor assembly (e.g., each of a plurality of conveyor sections of a conveyor assembly) may comprise a conveyor surface defined by a top surface (e.g., a planar surface collectively defined by a plurality of rollers) configured to support one or more objects disposed thereon and facilitate the transportation of the one or more objects along the conveyor travel path and a conveyor frame that extends along the length of the conveyor assembly and provides structural support for the conveyor surface (e.g., a plurality of rollers, a belt assembly, and/or the like). In various embodiments, an exemplary finger guard apparatus may be positioned within a conveyor assembly so as to provide coverage over at least a portion of an internal conveyor portion (e.g., beneath the conveyor surface and within the conveyor frame of the conveyor assembly) in order to prevent unwanted (e.g., unauthorized) access to the internal conveyor portion and/or the various conveyor components disposed therein.

Figure 1:
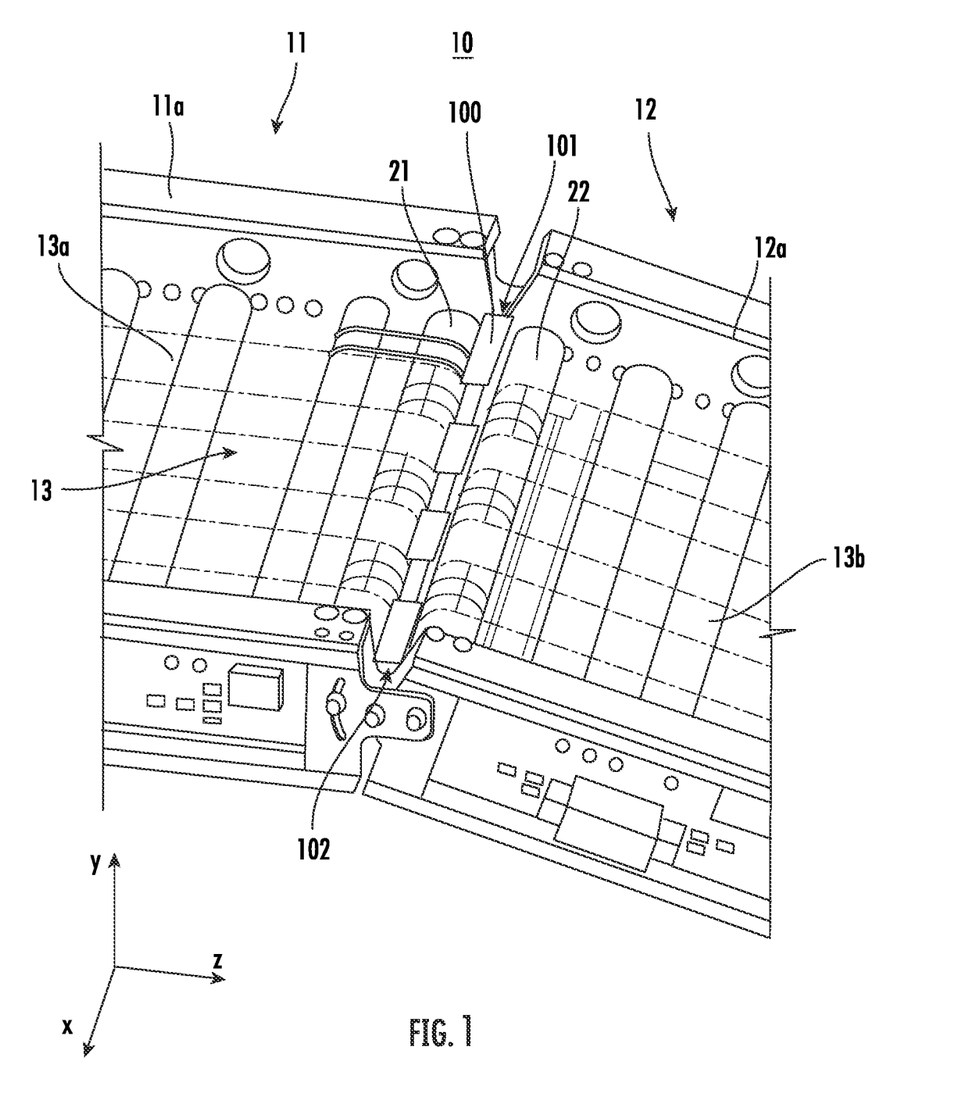
FIG. 1 illustrates a perspective view of an exemplary finger guard apparatus for a conveyor assembly configured in accordance with an example embodiment.

For example, FIG. 1 illustrates a perspective view of an exemplary finger guard apparatus for a conveyor assembly configured in accordance with an example embodiment. In particular, FIG. 1 illustrates an exemplary finger guard apparatus arranged relative to a conveyor surface 13 of a conveyor assembly 10. In various embodiments, a conveyor assembly 10 may comprise a first conveyor section 11 and a second conveyor section 12 embodying adjacent conveyor sections of a conveyor assembly 10. As illustrated, the first conveyor section 11 comprises a first conveyor frame 11a and a second conveyor section 12 comprises a second conveyor frame 12a. For example, an exemplary conveyor frame (e.g., first conveyor frame 11a, second conveyor frame 12a) may comprise two opposing sidewalls provided on opposing lateral sides of the conveyor surface 13 (e.g., first conveyor surface 13a, second conveyor surface 13b) that extend along the length of the conveyor assembly and/or a respective conveyor section (e.g., in the z-direction as illustrated in FIG. 1) and are configured to provide structural support for the conveyor surface 13 along the length of the conveyor assembly 10. Further, the first conveyor section 11 comprises a first conveyor surface 13a and a second conveyor section 12 comprises a second conveyor surface 13b arranged relative to the first conveyor surface 13a such that the first and second conveyor surfaces 13a, 13b collectively define conveyor surface 13. In various embodiments, the conveyor surface 13 of a conveyor assembly 10 may be a top planar surface that is defined by the collective of a plurality of rollers. Alternatively, or additionally, in various embodiments, the conveyor surface may comprise motorized drive rollers, a belt conveyor, and/or any other conveying means configured for moving an object disposed thereon along the conveyor travel path towards a destination location. For example, as illustrated, the first conveyor surface 13a may be defined at least in part by a first conveyor roller 21 supported by the conveyor frame of the first conveyor section 11 and the second conveyor surface 13b may be defined at least in part by a second conveyor roller 22 supported by the conveyor frame of the second conveyor section 12, such that the first and second conveyor rollers 21, 22 embody adjacent rollers of the conveyor surface 13.

As illustrated in FIG. 1, an exemplary finger guard apparatus 100 may be arranged relative to a conveyor surface 13 of a conveyor assembly 10 so as to provide coverage over a portion of an internal conveyor portion (e.g., providing coverage over an internal portion of the conveyer assembly 10 defined beneath the conveyor surface 13 and within the conveyor frame 11a, 12a) in order to prevent unwanted (e.g., unauthorized) access to the internal conveyor portion and/or the various conveyor components disposed therein. An exemplary finger guard apparatus 100 may be positioned between opposing lateral sidewalls of the conveyor frame so as to extend laterally along a conveyor width of the conveyor assembly 10. For example, as described herein, the finger guard apparatus 100 is defined at least in part by a width that, upon the finger guard apparatus 100 being positioned in an installed configuration within the conveyor assembly 10, may extend between a first lateral end 101 positioned at least substantially adjacent a first opposing lateral sidewall of a conveyor frame of the conveyor assembly and a second lateral end 102 positioned at least substantially adjacent a second opposing lateral sidewall of the conveyor frame. In various embodiments, as shown in FIG. 1, an exemplary finger guard apparatus 100 may be positioned within a gap defined between adjacent conveyor sections 11, 12 of the conveyor assembly 10, such as, for example, between a frontmost roller 21 of a first conveyer section 11 and a rearmost roller 22 of a second conveyor section 12 that is adjacent the first conveyor section 11. For example, in such an exemplary circumstance, the adjacent conveyor sections 11, 12 between which the finger guard apparatus 100 is disposed may be defined by respective conveyor surfaces 11a, 12a that are arranged at different angular configurations relative to one another. Alternatively, or additionally, a finger guard apparatus 100 may be provided within a single conveyor section, such as, for example, within an opening defined between adjacent rollers of the same conveyor section.

Figure 2:
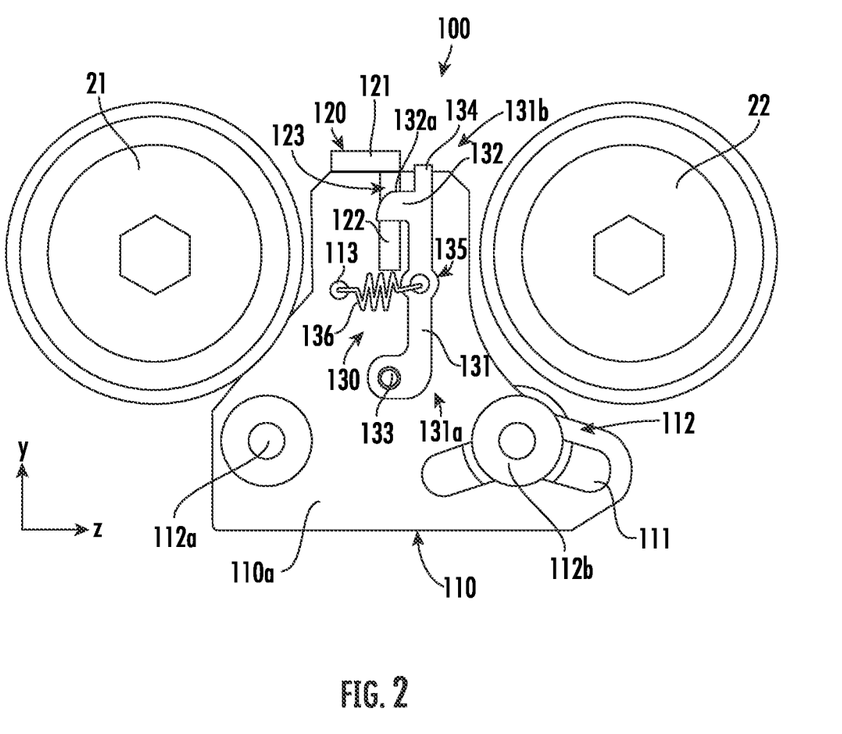
FIG. 2 illustrates a cross-sectional view of an exemplary finger guard apparatus according to an exemplary embodiment described herein.

FIG. 2 illustrates a cross-sectional view of an exemplary finger guard apparatus according to an exemplary embodiment described herein. In particular, FIG. 2 illustrates an exemplary finger guard apparatus 100 comprising a mounting bracket 110, a finger guard plate 120, and a lock assembly 130. In various embodiments, as described herein, the exemplary finger guard apparatus 100 may include a finger guard plate 120 that is configured to be arranged relative to the mounting bracket 110 and may be detachably secured in an installed configuration by a lock assembly 130 that is provided at an interior mounting bracket surface 110a of the mounting bracket 110. As described herein, the lock assembly 130 may be configurable between a locked position and an unlocked position to facilitate the selective removal of the finger guard plate 120 from the installed configuration relative to the mounting bracket 110. In various embodiments, the lock assembly 130 may exhibit a biased configuration towards a locked position such that the finger guard apparatus 100 is configured to enable selective removal of the finger guard plate 120 from an installed configuration relative to the mounting bracket 110 upon a user engagement and/or interaction with the lock assembly 130 that is defined by the lock assembly 130 being at least temporarily reconfigured from the locked position to an unlocked position. In such an exemplary circumstance, as described herein, the finger guard apparatus 100 may be configured such that, upon a user disengagement of the lock assembly 130, the lock assembly 130 may automatically return to a default and/or stable position defined by the locked position, wherein the range of motion of the finger guard plate 120 relative to the mounting bracket 110 is at least partially restricted in a vertical direction (e.g., in the y-direction, as illustrated).

In various embodiments, an exemplary finger guard apparatus 100 may comprise a mounting bracket 110 configured to be fixedly secured to a portion of a conveyor frame so as to define the position of the finger guard apparatus 100 along the length of a conveyor assembly. For example, the mounting bracket 110 may be configured to be secured to a first lateral conveyor frame portion of a conveyor frame (e.g., a sidewall of the conveyor frame provided along a first lateral side of the conveyor assembly) such that the mounting bracket 110 defines a first lateral side of the finger guard apparatus 100. As illustrated, in various embodiments the mounting bracket 110 may comprise an at least substantially planar rigid component comprising at least one fastening aperture 111 that extends through the thickness of the mounting bracket 110 and is configured to receive and/or at least partially secure a fastening means 112 therein to facilitate the attachment of the mounting bracket 110 to the conveyor frame. In various embodiments, the at least one fastening aperture 111 may comprise a slot having a length that extends along the mounting bracket 110 and is defined by an at least partially curved profile. In various embodiments, the curved profile of the at least one fastening aperture 111 may be configured to accommodate a change in angular configuration of one of the two adjacent conveyor sections to which the finger guard apparatus 100 is secured. For example, in various embodiments, the finger guard apparatus 100 may be secured to a first conveyor section via a first fastening means 112a and a second conveyor section via a second fastening means 112b, wherein the second conveyor section is adjacent the first conveyor section and configured to have an adjustable angular configuration (e.g., an adjustable incline and/or decline) such that the relative angular configuration between the first and second adjacent conveyor sections is variable. In such an exemplary circumstance, the at least one fastening aperture 111 within which the second fastening means 112b is secured may be configured such that, as the second conveyor section is moved throughout an rotational range of motion, the second fastening means 112b may be slid, translated and/or otherwise moved along the curved profile of the fastening aperture such that the forces transferred to the mounting bracket as a result of the angular movement of the second conveyor section are minimized. As illustrated in FIG. 2, in various embodiments, the curved profile of the at least one fastening aperture 111 may comprise an at least substantially "U"-shaped curve such that the finger guard apparatus 100 is configured to accommodate a change in angular configuration in both an incline direction and a decline direction. Further, as non-limiting examples, in various embodiments, the fastening means 112 may comprise a bolt, a pin, a latch, a hook, and/or any other suitable mechanical fastening means configured to engage both the mounting bracket 110 and the conveyor frame to secure the mounting bracket 110 relative to the conveyor frame. In various embodiments, the mounting bracket 110 may be defined at least in part by an inner mounting bracket surface 110a along which at least a portion of the lock assembly 130 of an exemplary finger guard apparatus 100 may be arranged, as described in further detail herein.

In various embodiments, an exemplary finger guard apparatus 100 may comprise a finger guard plate 120 comprising one or more surfaces that extend between opposing lateral sides of a conveyor frame and are configured to provide a physical obstruction preventing access to an internal conveyor portion of a conveyor assembly through a portion of the conveyor surface that corresponds to the position of the finger guard apparatus 100. In various embodiments, the finger guard plate 120 may be detachably secured relative to the mounting bracket 110 based at least in part on the arrangement of the lock assembly, as described herein. In various embodiments, the finger guard plate 120 may be defined at least in part by a width that extends between at a first finger guard plate lateral end and a second finger guard plate lateral end, which may be positioned at least substantially adjacent a first lateral side and an opposing second lateral side, respectively, of the conveyor frame. As a non-limiting example, the finger guard plate 120 may be arranged such that the first finger guard plate lateral end thereof is detachably secured relative to the mounting bracket 110, such as, for example, by being removably engaged with at a top portion of the mounting bracket 110. In various embodiments, for example, at least a portion of the finger guard plate 120 (e.g., the first finger guard plate lateral end) may be configured to physically engage the mounting bracket 110 such that the mounting bracket 110 supports the finger guard plate 120 in an installed configuration. As a non-limiting example, the finger guard apparatus 100 may be configured such that a portion of the finger guard plate 120 may rest atop a top surface of the mounting bracket 110 so as to define a removeable (e.g., detachable) connection therebetween. As described herein, the finger guard plate 120 may be secured in the installed configuration relative to the mounting bracket 110 upon the lock arm 131 of the lock assembly 130 being positioned in a locked position. In various embodiments, as non-limiting examples, the finger guard plate 120 may be made an at least substantially rigid material, such as, for example, a plastic material, a composite material (e.g. fiber glass, carbon fiber with resin), a metal material (e.g., an expanded metal material), an alloy material, a wood material, a rigid fibrous material (e.g., a recycled compacted carton material), and/or the like, or any other suitable material capable of providing at least partial physical coverage over an opening defined within the conveyor assembly.

In various embodiments, the finger guard plate 120 may comprise one or more guard sheets arranged relative to one another. For example, as illustrated in FIG. 2, the finger guard plate 120 may comprise an upper guard sheet 121 defining a top portion of the finger guard plate 120 and a lower guard sheet 122 extending from a bottom surface thereof such that the finger guard plate 120 has a cross-sectional profile that is at least substantially "L"-shaped or "T"-shaped. In various embodiments, the upper guard sheet 121 of the finger guard plate 120 may comprise a material sheet having a top surface configured to face in an at least substantially upward vertical direction (e.g., in the positive y-direction, as illustrated in FIG. 2) when the finger guard plate 120 is in an installed configuration relative to the mounting bracket 110. The upper guard sheet 121 of the finger guard plate 120 may comprise an at least substantially planar component (e.g., a material sheet and/or the like) configured to function as a physical barrier providing coverage over at least a portion of an internal conveyor portion of the conveyor assembly. As described herein, the upper guard sheet 121 may comprise an at least substantially rigid material component having a finger guard plate coverage area that is defined at least in part by a width extending between the two opposing sidewalls of the conveyor frame in a lateral direction along at least a portion of the conveyor width, and a length extending in a length direction along a portion of a conveyor length (e.g., in a z-direction, as illustrated in FIG. 2). In various embodiments, the relative position of the finger guard plate 120 and the mounting bracket 110 may be based at least in part on an engagement of the upper guard sheet 121 with a top portion of the mounting bracket 110, such as, for example, by a lateral end portion of a bottom surface (e.g., a downward-facing surface opposite the top surface) of the upper guard sheet 121 being disposed on top of a top surface of the mounting bracket 110.

Further, in various embodiments, the finer guard plate 120 may comprise a lower guard sheet 122 that extends from a bottom surface of the upper guard sheet 121 and is configured to facilitate the attachment of the finger guard plate 120 relative to the mounting bracket 110 and the detachable configuration therebetween, as described herein. In various embodiments, wherein the finger guard plate 120 is provided in an installed configuration within a conveyor assembly, as illustrated in FIG. 2, the lower guard sheet 122 may extend from the bottom surface of the upper guard sheet 121 in an at least substantially downward vertical direction (e.g., in the negative y-direction, as illustrated in FIG. 2) towards the internal conveyor portion of the conveyor assembly. As a non-limiting example illustrated in FIG. 2, the lower guard sheet 122 may extend from the upper guard sheet 121 such that the finger guard plate 120 comprises a T-bar configuration, wherein the length of the lower guard sheet 122 is arranged in an at least substantially vertical configuration perpendicular to the length of the upper guard sheet 121. For example, in such an exemplary configuration, the thickness of the lower guard sheet 122 is defined in a direction that is at least substantially parallel to the length of the conveyor surface (e.g., in a z-direction, as illustrated in FIG. 2). In various embodiments, the relative position of the finger guard plate 120 and the mounting bracket 110 may be based at least in part on an engagement of the lower guard sheet 122 with an inner mounting bracket surface 110a of the mounting bracket 110, such as, for example, an engagement wherein a lateral end portion of the lower guard sheet 122 is physically abutted against the inner mounting bracket surface 110a so as to at least partially restrict the relative range of motion between the finger guard plate 120 and the mounting bracket 110 in a lateral direction.

As described in further detail herein, the finger guard apparatus 100 may be configured such that the configuration of the lock assembly 130 in a locked position may be defined based on an interaction of the lock arm 131 with the lower guard sheet 122. For example, in various embodiments, the finger guard plate 120 may comprise a finger guard plate slot 123 extending through the thickness of the lower guard sheet 122 at a position near the first finger guard plate lateral end of the finger guard plate 120. As described herein, the finger guard plate slot 123 may comprise an opening within which the lower guard sheet 122 is configured to receive at least a portion of the lock arm 131 of the lock assembly 130. The finger guard plate slot 123 provided within the lower guard sheet 122 is configured to restrict the movement of lock arm 131 disposed therein in one or more directions, such as, for example, a vertical direction (e.g., in the positive y-direction, as illustrated), in order to secure the finger guard plate 120 relative to the mounting bracket 110 and prevent the finger guard plate 120 from being removed from the conveyor assembly.

In various embodiments, an exemplary finger guard apparatus 100 may further comprise a lock assembly 130 for securing the finger guard plate 120 in a locked position relative to the mounting bracket 110 and facilitating the selective detachment of the finger guard plate 120 from the mounting bracket 110. As illustrated in FIG. 2, the lock assembly 130 of an exemplary finger guard apparatus 100 may comprise a lock arm 131 and a retention element 136. In various embodiments, the lock arm 131 of the lock assembly 130 may be connected to the mounting bracket 110 such that the lock arm 131 is configured to move between a locked position and an unlocked position, as described herein. For example, in various embodiments, the lock arm 131 may be hingedly connected to a lock arm hinge 133 that is arranged relative to the mounting bracket 110 such that the axis of rotation defined by the lock arm hinge 133 extends in a direction that is at least substantially perpendicular to the inner mounting bracket surface 110a (e.g., in a lateral direction that is at least substantially perpendicular to the y-z plane as illustrated in in FIG. 2). In such an exemplary circumstance, the range of motion of the lock arm 131 may be defined within a plane that is at least substantially adjacent and/or parallel to the inner mounting bracket surface 110a of the mounting bracket 110. The lock arm 131 may be defined at least in part by an arm length that extends from a proximal end 131a of the arm that is hingedly connected to the lock arm hinge 133 to a distal end 131b that may define a user engagement portion 134 of the lock arm 134.

In various embodiments, the lock arm 131 may be configured to rotate about the lock arm hinge 133 so as to define a range of motion that extends between a locked position and an unlocked position, as described herein. The lock arm 131 may be selectively configurable between a locked position and an unlocked position to facilitate the selective detachment and/or removal of the finger guard plate 120 from an installed configuration relative to the mounting bracket 110 within the conveyor assembly. In various embodiments, the locked position of the lock arm 131 may be defined by the engagement of at least a portion of the lock arm 131 with the finger guard plate 120, such as, for example, by an arrangement wherein a lock arm protrusion 132 of the lock arm 131 is disposed within the finger guard plate slot 123 that extends through the lower guard sheet 122 of the finger guard plate 120. Further, an unlocked position of the lock arm 131 may be defined by the lock arm 131 being disengaged with the finger guard plate 120, such as, for example, by the lock arm 131 being arranged such that the lock arm protrusion 132 is entirely removed from within the finger guard plate slot 123. In an exemplary circumstance wherein the lock assembly (e.g., the lock arm 131) is provided in an unlocked position, the finger guard plate 120 may be moved relative to the mounting bracket 110 in a vertical direction (e.g., in the positive y-direction, as illustrated in FIG. 2) without interference from the lock arm 131, such as, for example, in order to remove the finger guard plate 120 from the conveyor assembly.

In various embodiments, the lock arm protrusion 132 of the lock arm 131 may comprise an upper protrusion surface 132a having an at least partially curved and/or angled profile relative to the length of the lock arm 131. In such an exemplary configuration, the lock assembly 130 of the finger guard apparatus may be configured to facilitate a simplified installation of the removeable finger guard plate 120 in an installed configuration relative to the mounting bracket 110. For example, in an exemplary circumstance wherein the mounting bracket 110 is secured relative to a conveyor frame of the conveyor assembly and the lock assembly 130 is connected relative to the interior mounting bracket surface 110a of the mounting bracket 110 such that the lock arm 131 is provided in a default locked position (e.g., in an upright vertical position), as described herein, the finger guard plate 120 may be positioned in an installed configuration relative to the mounting bracket 110 by forcing the finger guard plate 120 in a downward direction such that a bottom portion of the lower guard sheet 122 applies a downward force on the lock arm protrusion 132. The curved and/or angled configuration of the upper protrusion surface 132a may cause the downward force applied thereto to result in the lock arm protrusion 132 being moved in a horizontal direction (e.g., in the z-direction, as illustrated) that, based on the hinged configuration of the lock arm 131, causes the lock arm 131 to at least temporarily rotate away from the finger guard plate in the clockwise direction (e.g., according to the orientation illustrated in FIG. 2). Upon the finger guard plate 120 being lowered relative to the mounting bracket 110 to a position wherein the lock arm protrusion 132 is aligned with the finger guard plate slot 123, the lock arm 131, based at least in part on the configuration of the retention element 136, as described herein, may be retracted towards a locked position wherein the lock arm protrusion 132 is positioned within the finger guard plate slot 123, thereby securing the position of the finger guard plate 120 relative to the mounting bracket 110 in a vertical direction.

Although FIG. 2 illustrates an exemplary finger guard apparatus 100 wherein the proximal arm end 131a of the lock arm 131 is hingedly connected to the mounting bracket 110 via the lock arm hinge 133 such that the lock arm 131 is configured to rotate about the lock arm hinge 133 between the locked position and the unlocked position, it should be understood that in various embodiments, the proximal arm end 131a of the lock arm 131 may be fixedly secured to the mounting bracket 110. For example, in various embodiments, the lock arm 131 may be made of an at least partially elastic material, such as, for example, a rubber material, a plastic material, and/or the any other at least partially elastic material capable of exhibiting an elastic deformation defined by a bending along the length of the lock arm 131 between the fixedly secured proximal arm end 131a and the distal arm end 131b. In such an exemplary configuration, the lock arm 131 may be reconfigured from the locked position to an unlocked position based at least in part on an elastic deformation of the lock arm 131 wherein a user interaction therewith causes the lock arm 131 to bend such that the distal arm end 131b is moved away from the finger guard plate 120 (e.g., the finger guard plate slot 123. For example, in such an exemplary circumstance, the lock arm 131 may be configured relative to the mounting bracket 110 such that the lock arm 131 defines an at least partially elastically deformed configuration in the locked position, wherein the at least partially elastically deformed configuration of the lock arm 131 is configured to rotationally bias the distal arm end 131b of the lock arm 131 towards the finger guard plate 120. In such an exemplary circumstance, an exemplary finger guard apparatus 100 may be operable using a lock assembly 130 wherein the lock arm 131 and the retention element 136 are not distinct components, but instead wherein the at least partially elastic configuration of the lock arm 131 operably functions as the retention element such that a separate component and/or part are not required.

Further, although the exemplary FIG. 2 illustrates an exemplary finger guard apparatus 100 wherein the lock arm 131 is hingedly connected to the mounting bracket 110 via the lock arm hinge 133 such that the lock arm 131 is configured to rotate about the lock arm hinge 133 between the locked position and the unlocked position, it should be understood that in various embodiments, the lock arm 131 may moveably secured relative to the mounting bracket 110 such that the lock arm 131 may be linearly translated between the locked position and the unlocked position. For example, in various embodiments, the mounting bracket 110 may comprise one or more lock arm slots through which an end of the lock arm may be extended and/or connected. The one or more lock arm slots may extend through the thickness of the mounting bracket 110 and may be configured to receive, for example, a respective one of the proximal arm end 131a and/or the distal arm end 131b. In such an exemplary circumstance, the movement of the lock arm 131 between a locked position and an unlocked position may be defined by the movement of the lock arm 131 along the lock arm slot(s) relative to the mounting bracket 110. For example, the one or more lock arm slots may comprise a plurality of lock arm slots having respective lengths extending in a parallel configuration along the mounting bracket 110 such that the movement of the lock arm 131 between the locked position and the unlocked position comprises a liner translation of the lock arm 131 relative to the mounting bracket 110.

In various embodiments, as described in further detail herein, the retention element 136 of the lock assembly 130 may be connected to the lock arm 131 and configured to bias the lock arm 131 towards the locked position. In various embodiments, the retention element 136 may be connected to both the mounting bracket 110 and the lock arm 131 such that the movement of the lock arm 131 about the lock arm hinge between the locked position and an unlocked position 133 (e.g., relative to the mounting bracket 110) is affected one or more retention element forces corresponding to the configuration of the retention element 136 that act on the lock arm 131. In various embodiments, the retention element 136 may be configured to facilitate repeatability within the finger guard apparatus 100 by being predisposed to cause one or more components of the lock assembly 130, such as, for example, the lock arm 131, to be moved to a neutral, default, and/or otherwise stable state when no other external forces, such as, for example, forces from user interaction with the lock arm 131, are present. As non-limiting examples provided for illustrative purposes, in various embodiments, an exemplary retention element 136 may comprise a spring element (e.g., a torsional spring element, a tension spring element, a compression spring element, and/or the like), an at least partially elastic material element comprising a material configured to operably apply and/or transfer a retaining force to the lock arm 131, as described herein, and/or any other suitable mechanical tensioning means configured for arrangement about the mounting bracket 110 and engagement with the lock arm 131 to operably facilitate the imposition of a retention force on the lock arm 131, as described herein. In various embodiments wherein the retention element 136 comprises a spring element, the retention element 136 may be configurable between a neutral position and an at least partially expanded position based at least in part on the configuration of the lock arm 131 (e.g., between the locked position and an unlocked position). For example, in various embodiments, the retention element 136 may define a neutral position when the lock arm 131 is in a locked position and may be reconfigured to an at least partially expanded position as the lock arm is rotated about the lock arm hinge 133 in a direction away from the finger guard plate 120. Alternatively, or additionally, as described herein, the retention element 136 may define at least partially expanded position when the lock arm 131 is in a locked position such that the lock arm 131 is at least substantially continuously biased (e.g., pulled) toward the finger guard plate 120, even when the lock arm 131 is provided in the locked position.

For example, as illustrated in FIG. 2, the retention element 136 may extend between a first end fixedly secured at a mounting bracket anchor portion 113 provided on the mounting bracket 110 (e.g., at the inner mounting bracket surface 110a) and a second end secured to the lock arm 131 (e.g., at a retention element attachment portion 135 provided along a central portion of the length of the lock arm 131). In various embodiments, the mounting bracket anchor portion 113 may be arranged along the inner mounting bracket surface 110a relative to the retention element attachment portion 135 of the lock arm 131 such an exemplary force generated by the retention element 136 and acting on the lock arm 131 may embody a pulling force in that acts on the retention element attachment portion 135 in a direction at least substantially towards the mounting bracket anchor portion 113 such that the lock arm protrusion 132 is biased towards the finger guard plate 120 and/or the locked position (e.g., via a counter-clockwise moment imparted on the lock arm 131, according to the orientation illustrated in FIG. 2). For example, as illustrated, when the lock arm 131 is arranged in a locked position, both the retention element attachment portion 135 and the mounting bracket anchor portion 113 may be positioned above the lock arm hinge 13, as measured in the vertical direction (e.g., in the y-direction, as illustrated). In various embodiments, the retention element attachment portion 135 may be positioned at least substantially near a midpoint of the length of the lock arm 131.

In various embodiments, as illustrated in the exemplary embodiment shown in FIG. 1, a finger guard apparatus 100 may comprise a plurality of mounting brackets, including a first mounting bracket configured to be secured to a first lateral conveyor frame portion of a conveyor frame (e.g., a first lateral sidewall of the conveyor frame provided along a first lateral side of the conveyor assembly) and a second mounting bracket configured to be secured to a second lateral conveyor frame portion of the conveyor frame (e.g., a second lateral sidewall of the conveyor frame provided along a second lateral side of the conveyor assembly). In such an exemplary circumstance, the finger guard plate 120 of the finger guard apparatus 100 may be arranged such that the first finger guard plate lateral end thereof is detachably secured relative to the first mounting bracket 110, as described above in reference to FIG. 2, and the second finger guard plate lateral end thereof is detachably secured relative to the second mounting bracket that is fixedly secured to the second lateral sidewall of the conveyor frame. Although the exemplary embodiment described herein in reference to FIG. 2 describes a first lateral end of the finger guard apparatus 100 and the mounting bracket 110, lock assembly 130, and portions of the finger guard plate 120 arranged relative thereto (e.g., the finger guard plate slot 123), it should be understood that an exemplary finger guard apparatus 100 comprising a second mounting bracket that defines a second lateral end thereof and is configured to be secured to a second lateral sidewall of the conveyor apparatus may further comprise a second lock assembly and a second finger guard plate slot arranged relative to the second mounting bracket. In various embodiments, for example, the second mounting bracket, second lock assembly, and second finger guard plate slot arranged relative to the second finger guard plate lateral end of the finger guard plate 120 may individually and/or collectively comprise an at least substantially mirrored configuration relative to the mounting bracket 110, lock assembly 130, and finger guard plate slot 123 described above in reference to FIG. 2. In such an exemplary circumstance, the finger guard apparatus 100 may be configured such that both the lock assembly 130 (e.g., the lock arm 131) and the second lock assembly (e.g., a second lock arm of the second lock assembly) must be positioned in respective unlocked positions in order for the finger guard plate 120 to be movable relative to the first and second mounting brackets for selective removal from an installed configuration within the conveyor assembly.

Figure 3A:
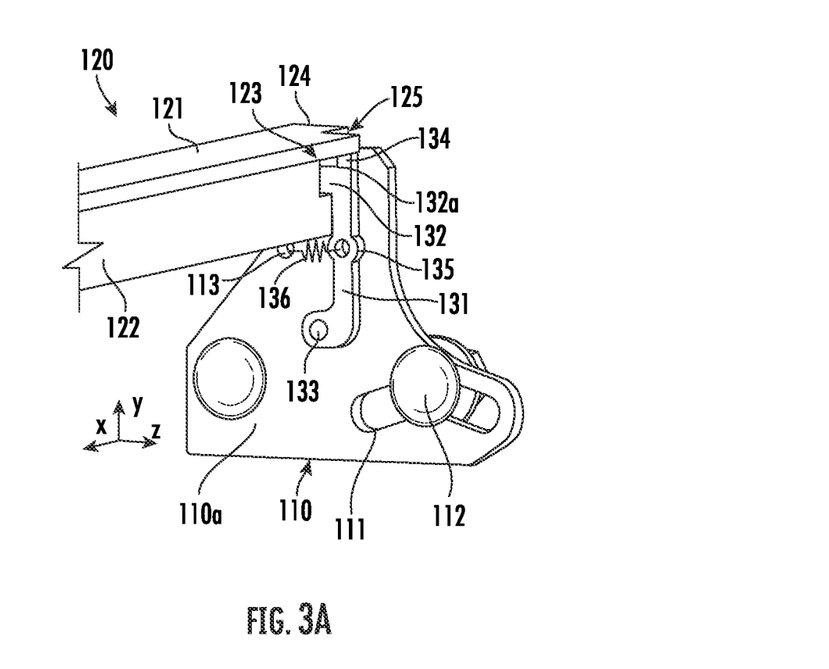
FIGS. 3A-3C illustrate various perspective views of exemplary finger guard apparatuses in accordance with various embodiments described herein.
Figure 3B:
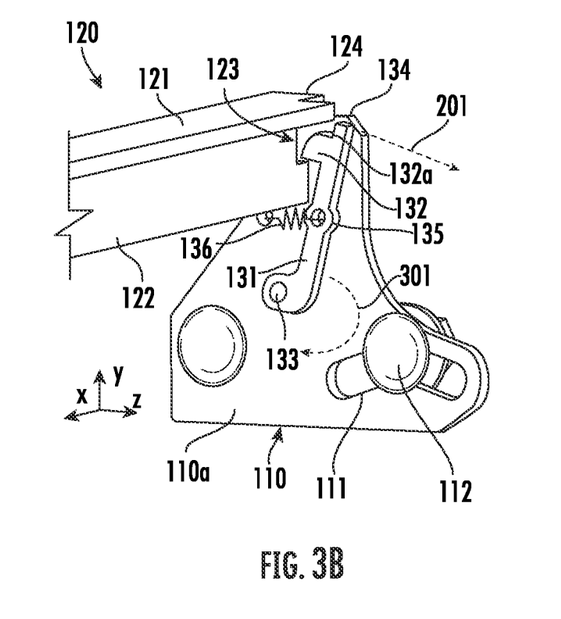
Figure 3C:
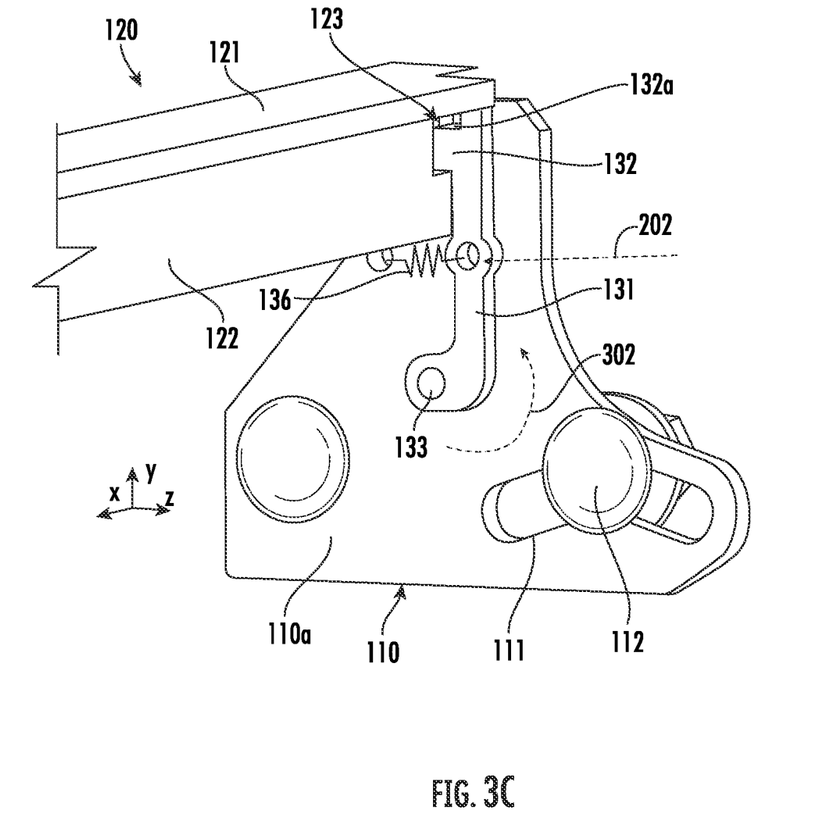

FIGS. 3A-3C illustrate various perspective views of exemplary finger guard apparatuses in accordance with various embodiments described herein. For simplicity and ease of illustration, the exemplary finger guard apparatuses 100 are shown in isolation, outside of the conveyor assembly environment; however, one of ordinary skill in the art will appreciate, in light of the present disclosure, that the exemplary finger guard apparatuses 100 described herein may be configured for arrangement along a conveyor surface of a conveyor assembly. In particular, FIG. 3A shows an exemplary finger guard apparatus 100 comprising a mounting bracket 110, a finger guard plate 120, and a lock assembly 130, wherein the lock assembly 130 is arranged in a locked position. As described herein, the lock assembly 130 of the finger guard apparatus 100 includes a lock arm 131 that is hingedly connected to the mounting bracket 110 and configurable between a locked position and an unlocked position. The configuration of the lock assembly 130 between the locked position and an unlocked position is based at least in part on the configuration of the lock arm 131 (e.g., between the locked position and an unlocked position).

The lock arm 131 is shown in a locked position in FIG. 3A, wherein at least a portion of the lock arm 131 is engaged with the finger guard plate 120 so as to constrain the movement of the finger guard plate 120 in a vertical direction (e.g., in the positive y-direction, as illustrated) and selectively fix the position of the finger guard plate 120 relative to the mounting bracket 110 attached to a conveyor frame. As described herein, a locked position of an exemplary lock arm 131 of a lock assembly 130 may be defined by a position assumed by the lock arm 131 in which at least a portion of the lock arm 131, such as, for example, a lock arm protrusion 132 extending therefrom in a direction at least substantially perpendicular to the length of lock arm 131, is disposed within a lock arm engagement slot 123 that extends through a thickness of the lower guard sheet 122 of the finger guard plate 120. For example, the positioning of the lock arm protrusion 132 of the lock arm 131 within the lock arm engagement slot 123 of the finger guard plate 120 at least substantially restricts the extent to which the finger guard plate 120 may be moved relative to the lock arm 131 (e.g., in the vertical direction). As such, an exemplary lock assembly 130 arranged in a locked position may be configured to prevent the finger guard plate 120 from being removed from an installed configuration within the conveyor assembly.

In various embodiments, the lock assembly 130 may further comprise the retention element 136 operatively secured to the lock arm 131 and configured to apply a pulling force (e.g., a pulling spring force) to the lock arm 131 in order to at least partially affect the position of the lock arm 131 between the locked position and the unlocked position. For example, the retention element 136 may be operatively secured between a retention element attachment portion 135 of the lock arm 131 and the mounting bracket 110 (e.g., at an inner mounting bracket surface 110a). The retention element 136 may be configured such that when the lock arm 131 is arranged in the locked position, as illustrated in FIG. 3A, the retention element 136 may be provided in an at least partially engaged (e.g., strained, expanded, tensioned, and/or the like) configuration, wherein a force generated by the retention element 136 acts to the lock arm 131 towards the finger guard plate 120. In various embodiments, the retention element 136 may be fixedly secured to a mounting bracket anchor portion 113 that is positioned at the inner mounting bracket surface 110a such that the tension force generated by the retention element 136 and imparted as a pulling force on the lock arm 131 (e.g., embodying a non-lateral torque, a moment, and/or the like acting on the lock arm 131) may cause the lock arm 131 to rotate about the lock arm hinge 133 in a counter-clockwise direction (e.g., a counter-clockwise rotational direction about the lock arm hinge 133 relative to the orientation of FIG. 3A), pulling the lock arm protrusion 132 of the lock arm 131 towards the finger guard plate 120 such that the lock arm 131 is biased towards the locked position.

As illustrated, the finger guard plate 120 may be configured relative to the mounting bracket 110 such that the lower guard sheet 122 of the finger guard plate 120, including the finger guard plate slot 123, is positioned at least substantially above the lock arm hinge 133 of the lock assembly 130 and vertically aligned with the lock arm hinge 133. In such an exemplary configuration, upon the lock arm 131 being rotated towards the finger guard plate 120 to the locked position wherein the lock arm protrusion 132 is engaged with the finger guard plate slot 123, the lock arm 131 is arranged in an at least substantially upright (e.g., vertical) configuration. For example, in such an exemplary configuration, a user engagement portion 134 of the lock arm 131, which may be defined as a distal end of the lock arm opposite the proximal end secured to the lock arm hinge 133, may define a top portion of the lock arm 131 that is disposed at least substantially adjacent a top surface of the mounting bracket 110 when the lock arm 131 is positioned in a locked position. In various embodiments, the lock assembly 130 may be configured such that when the lock arm 131 is arranged in the locked position, the user engagement portion 134 of the lock arm 131 is accessible to a user for selective interaction and/or reconfiguration via a portion of the conveyor surface and/or another opening defined along a top portion of the conveyor assembly adjacent the finger guard apparatus 100. For example, in various embodiments, the finger guard plate 120 may comprise a material recess 125 defined within the upper guard sheet 121 (e.g., positioned at least substantially adjacent a first finger guard plate lateral end 124 of the finger guard plate 120) that is configured to enable user access to the user engagement portion 134 of the lock arm 131 therethrough. As described herein, a user may access the user engagement portion 134 of the lock arm 131 in order to selectively reconfigure the lock assembly 130 of the finger guard apparatus 100 from the locked position to an unlocked position by moving the user engagement portion 134 in a direction away from the finger guard plate 120.

With reference to FIG. 3B, an exemplary circumstance is depicted wherein the lock assembly 130 is configured in an unlocked position as a result of an actuation of the lock arm 131 with a force 201. As illustrated, an actuation of lock arm 131 may be embodied by a user engagement portion 134 provided at distal end of the lock arm 131 being pushed, pulled, and/or otherwise moved away from the finger guard plate slot 123 by a user, such that a force 201 is imparted on the lock arm 131 at the user engagement portion 134 in an at least substantially away from the finger guard plate 120 (e.g., in the positive z-direction, as illustrated in FIG. 3B). In various embodiments, the lock arm 131 is hingedly connected to the mounting bracket 110 at the lock arm hinge 133 extending from the inner mounting bracket surface 110a in a direction perpendicularly away therefrom (e.g., in the positive x-direction, as illustrated). In such an exemplary circumstance, the exemplary actuation force 201 applied to the user engagement portion 134 by a user may impart a non-lateral torque and a moment on the lock arm 131 at the user engagement portion 134 that causes the lock arm 131 to rotate about the clock arm hinge 133 in a rotational direction 301 to the unlocked position. For example, in such an exemplary circumstance, the rotation of the lock arm 131 towards an unlocked position upon actuation thereof, may be defined at least in part by at least a portion of the lock arm 131, such as, for example, the lock arm protrusion 132, moving relative to the finger guard plate 120 in a direction at least substantially away from the lower guard sheet 122 (e.g., in the positive z-direction, as illustrated). The lock arm 131 may be selectively reconfigured to an unlocked position based at least in part on user interaction therewith (e.g., at the user engagement portion 134), wherein the user causes the lock arm 131 to disengage the finger guard plate 120 by moving the lock arm 131 (e.g., rotating the user engagement portion 134) away from the finger guard plate 120 such that the lock arm protrusion 132 is removed from within the finger guard plate slot 122, thereby allowing the finger guard plate 120 to be moved relative to the mounting bracket 110 and removed from an installed configuration within the conveyor assembly.

In various embodiments, the lock assembly 130 of an exemplary finger guard apparatus 100 may be configured such that as the lock arm 131 is moved from a locked position to an unlocked positioned in response to a force 201 being applied to the lock arm 131, the retention element 136 connected to lock arm 131 may generate a force that acts on the lock arm 131 in a direction opposing the motion of the lock arm 131. For example, a movement of the lock arm 131 towards an unlocked position, as illustrated in FIG. 3B, may cause the retention element 136 to be reconfigured from a first engaged position exhibited by the retention element 136 when the lock arm 131 is in the locked position, as illustrated in FIG. 3A, to a second engaged position. For example, in an exemplary circumstance wherein the retention element 136 comprises a spring element, as illustrated in the exemplary finger guard apparatus 100 of FIGS. 3A-3C, the movement of the lock arm 131 from a locked position towards an unlocked position causes the retention element 136 to be reconfigured such that the spring element is further expanded from a first expanded position to a second expanded position. In such an exemplary circumstance, as the retention element 136 is expended to the second expanded position, the retention element 136 may at least substantially continuously apply a pulling force to the lock arm 131 (e.g., at the retention element attachment portion 135 of the lock arm 131) that opposes the force 201 being applied to the lock arm 131 by the user by imparting an equal and opposite non-lateral torque and a moment on the lock arm 131. For example, in the exemplary configuration illustrated in FIG. 3B, wherein the lock arm 131 is arranged in an unlocked position, the retention element 136 provided in the second expanded position may urge the lock arm protrusion 132 of the lock arm 131 towards the finger guard plate 120 via a pulling force acting on the retention element attachment portion 135 of the lock arm 131 from the retention element 136 (e.g., at least in partially in the negative-z direction, as illustrated).

The resultant force generated by the retention element 136 and imparted on the lock arm 131 to oppose the user-initiated force 201 (e.g., based at least in part on the retention element 136 being in an engaged and/or expanded configuration) may cause a non-lateral torque and a moment to be imparted on the lock arm 131 in a direction opposite of the first rotational direction 301, such as, for example, in the counter-clockwise direction relative to the orientation shown in FIG. 3B. For example, FIG. 3C illustrates an exemplary circumstance wherein, based on a resultant pulling force 202 generated by the retention element 136 and imparted on the lock arm 131, an exemplary lock assembly 130 may be configured to automatically move to a locked position upon a user releasing and/or otherwise disengaging the lock arm 131 such that the force 201 described in reference to FIG. 3B is at least substantially zero. In various embodiments, the force 202 may comprise a spring force embodying a pulling force that acts on the lock arm 131 (e.g., the retention element attachment portion 135 of the lock arm 131) to pull at least a portion of the lock arm 131, such as, for example, the lock arm protrusion 132, toward the finger guard plate 120. As illustrated, the force 202 acting on the lock arm 131 may be generated based at least in part on the engaged (e.g., expanded) configuration of the retention element 136. The hinged configuration of the lock arm 131 about the lock arm hinge 133 may cause the force 202 to impart a non-lateral torque and a moment on the lock arm 131 in a second rotational direction 302 such that the lock arm 131 is rotated about the lock arm hinge 133 from an unlocked position to the locked position. For example, the lock arm 131 is rotated in a counter-clockwise direction corresponding to the second rotational direction (e.g., relative to the orientation shown in FIG. 3C) until the lock arm 131 physically abuts at least a portion of the finger guard plate 120 and the lock arm protrusion 132 is positioned within the finger guard plate slot 123 (e.g., to restrict the movement of the finger guard plate 120 in a vertical direction relative to the mounting bracket 110). In various embodiments, as illustrated in FIG. 3C, as the lock assembly 130 is reconfigured from an unlocked position to the locked position based at least in part on the force 202 generated by the retention element 136 acting on the lock arm 131 (e.g., at the retention element attachment portion 135), at least a portion of the lock arm 131 configured to engage the finger guard plate 120 when the lock assembly 130 is arranged in the locked position, such as, for example, the lock arm protrusion 132, may exhibit a corresponding movement that is defined at least partially in a horizontal direction towards the finger guard plate 120 (e.g., the movement of the lock arm protrusion 132 includes a horizontal component defined in the negative z-direction, as illustrated).

Many modifications and other embodiments will come to mind to one skilled in the art to which this disclosure pertains having the benefit of the teachings presented in the foregoing descriptions and the associated drawings. Therefore, it is to be understood that the disclosure is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A finger guard apparatus for a conveyor assembly, the finger guard apparatus comprising:
    a mounting bracket configured to be secured to a first lateral conveyor frame portion of the conveyor assembly such that the mounting bracket defines a first lateral side of the finger guard apparatus;
    a finger guard plate detachably secured to the mounting bracket at a first finger guard plate lateral end, the finger guard plate comprising an upper guard sheet that extends between the first finger guard plate lateral end and a second finger guard plate lateral end; and
    a lock assembly that secures the finger guard plate in a locked position relative to the mounting bracket and is configured to facilitate selective detachment of the finger guard plate from the mounting bracket, the lock assembly comprising a lock arm extending between a proximal arm end and a distal arm end, the proximal arm end being fixedly secured to the mounting bracket;
    wherein the lock arm is made of an at least partially elastic material such that the lock arm is configured to move between a locked position and an unlocked position based at least in part on an arrangement of the distal arm end relative to the finger guard plate, wherein the lock arm is configured to engage the finger guard plate in the locked position; and
    wherein the lock arm is configured relative to the mounting bracket such that the lock arm defines an at least partially elastically deformed configuration in the locked position, wherein the at least partially elastically deformed configuration of the lock arm is configured to rotationally bias the distal arm end of the lock arm towards the finger guard plate.

\* \* \* \* \*